United States Patent
Zhou et al.

(10) Patent No.: US 12,342,214 B2
(45) Date of Patent: Jun. 24, 2025

(54) TERMINAL DEVICE, APPLICATION SERVER, NETWORK EXPOSURE FUNCTION NODE AND METHODS THEREIN

(71) Applicant: Telefonaktiebolaget LM Ericsson (PUBL), Stockholm (SE)

(72) Inventors: He Zhou, Guangzhou (CN); Jingrui Tao, Guangzhou (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 386 days.

(21) Appl. No.: 17/763,791

(22) PCT Filed: Jun. 29, 2020

(86) PCT No.: PCT/CN2020/098776
§ 371 (c)(1),
(2) Date: Mar. 25, 2022

(87) PCT Pub. No.: WO2021/063051
PCT Pub. Date: Apr. 8, 2021

(65) Prior Publication Data
US 2022/0408303 A1  Dec. 22, 2022

(51) Int. Cl.
*H04W 28/02* (2009.01)
*H04M 15/00* (2024.01)
*H04M 17/00* (2024.01)
*H04W 12/06* (2021.01)
*H04W 28/24* (2009.01)

(52) U.S. Cl.
CPC ....... *H04W 28/0268* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 10,285,155 B1 | 5/2019 | Dodd-Noble et al. | |
| 11,025,619 B2* | 6/2021 | Sun | H04L 9/3231 |
| 11,871,223 B2* | 1/2024 | Lei | H04W 60/04 |
| 2017/0317894 A1 | 11/2017 | Dao et al. | |

(Continued)

FOREIGN PATENT DOCUMENTS

| | | |
|---|---|---|
| CN | 110169089 A | 8/2019 |
| WO | WO2018208949 A1 | 11/2018 |
| WO | WO2019104357 A1 | 5/2019 |

OTHER PUBLICATIONS

3GPP TS 23.682 v15.9.0, Technical Specification, 3rd Generation Partnership Project; Technical Specification Group Services and System Aspects; Architecture enhancements to facilitate communications with packet data networks and applications (Release 15)—Jun. 2019.

(Continued)

*Primary Examiner* — Pablo N Tran
(74) *Attorney, Agent, or Firm* — Baker Botts L.L.P.

(57) ABSTRACT

The present disclosure provides a method (100) in a terminal device. The method (100) includes: transmitting (110) to a Network Exposure Function, NEF, node a Quality of Service, QoS, request including an Internet Protocol, IP, address of the terminal device and information enabling the NEF node to determine an identifier of the terminal device.

10 Claims, 8 Drawing Sheets

(56) References Cited

U.S. PATENT DOCUMENTS

| | | | |
|---|---|---|---|
| 2017/0367026 A1 | 12/2017 | Li et al. | |
| 2018/0270888 A1* | 9/2018 | Faccin | H04W 76/20 |
| 2018/0317086 A1* | 11/2018 | Ben Henda | H04W 12/062 |
| 2019/0075606 A1* | 3/2019 | Myhre | H04W 48/18 |
| 2019/0254016 A1* | 8/2019 | Lu | H04W 24/08 |
| 2021/0136589 A1* | 5/2021 | Kawasaki | H04W 12/08 |

OTHER PUBLICATIONS

3GPP TS 29.122 v.15.4.0, Technical Specification, 3rd Generation Partnership Project; Technical Specification Group Core Network and Terminals; T8 reference point for Northbound APIs (Release 15)—Jun. 2019.

3GPP TS 29.122 v16.2.0, Technical Specification, 3rd Generation Partnership Project; Technical Specification Group Core Network and Terminals; T8 reference point for Northbound APIs (Release 16)—Jun. 2019.

PCT Notification of Transmittal of the International Search Report and the Written Opinion of the International Searcihng Authority, or the Declaratnoi issued for International application No. PCT/CN2020/098776—Oct. 9, 2020.

3GPP TSG SA WG5 (Telecom Management) Meeting #115, Busan, Korea, Source: Huawei Technologies; Title: pCR TR 32.899 Update of Network Capability Exposure (S5-175314 (revision of S5-175083))—Oct. 16-20, 2017.

3GPP TSG-SA2 Meeting #128; Vilnius, Lithuania, Jul. 2-6, 2018; Change Request; 23.502 CR 0621 rev 2 Current version: 15.2.0; Title: Missing NEF services (S2-187587 (revision of S2-187060)).

Extended European Search Report issued for Application No./Patent No. 20871987.2-1215 / 4038939 PCT/CN2020098776—Sep. 6, 2023.

* cited by examiner

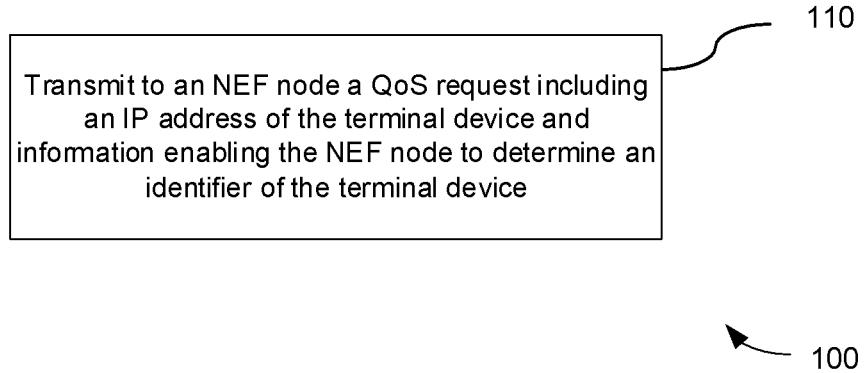
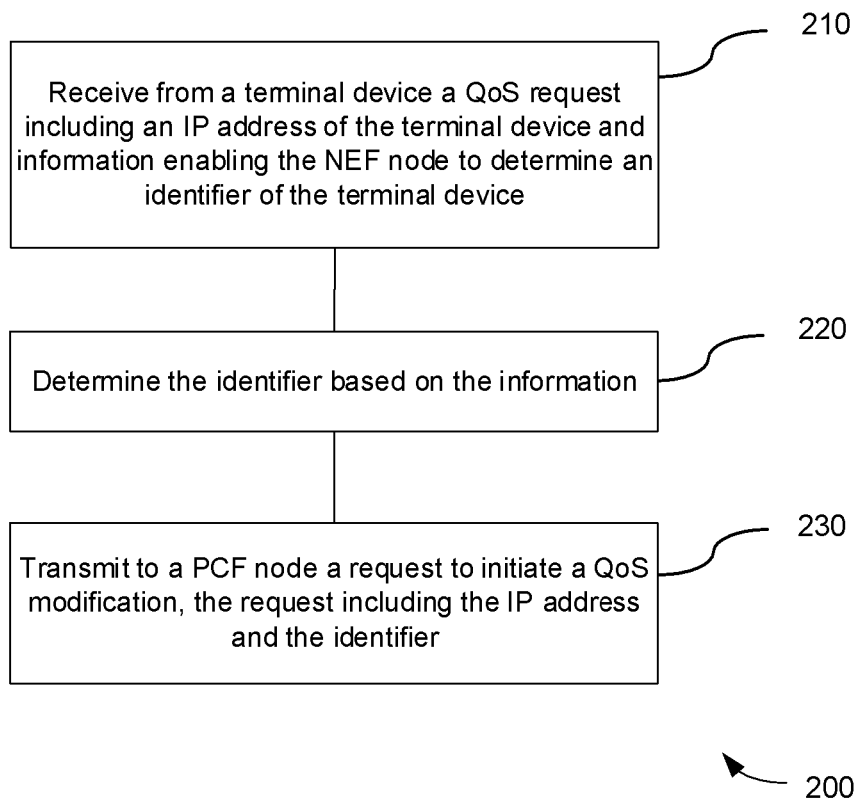

TERMINAL DEVICE, APPLICATION SERVER, NETWORK EXPOSURE FUNCTION NODE AND METHODS THEREIN

PRIORITY

This nonprovisional application is a U.S. National Stage Filing under 35 U.S.C. § 371 of International Patent Application Serial No. PCT/CN2020/098776 filed Jun. 29, 2020 and entitled "TERMINAL DEVICE, APPLICATION SERVER, NETWORK EXPOSURE FUNCTION NODE AND METHODS THEREIN" which claims priority to International Patent Application Serial No. PCT/CN2019/109408 filed Sep. 30, 2019 both of which are hereby incorporated by reference in their entirety.

TECHNICAL FIELD

The present disclosure relates to communication technology, and more particularly, to a terminal device, an application server, a Network Exposure Function (NEF) node and methods therein, e.g., for facilitating application driven Quality of Service (QoS).

BACKGROUND

Application Driven QoS, or ADQ, is a feature defined in the $3^{rd}$ Generation Partnership Project (3GPP) Technical Specification (TS) 23.682 (Release 15/16) and TS 23.502 (Release 15/16) that enables a third party application server (e.g., Service Capability Server/Application Server (SCS/AS)) to request a data session (referred to as AS session) to a terminal device (e.g., a User Equipment, or UE) served by the SCS/AS to be set up with a specific QoS (e.g., low latency or jitter). This functionality is exposed via a Network Exposure Function (NEF) node (or Service Capability Exposure Function (SCEF) node in Long Term Evolution (LTE)) towards the SCS/AS. With this functionality, the SCS/AS can request the QoS for the AS session based on application and service requirements with a QoS reference parameter which refers to pre-defined QoS information. Here, the pre-defined QoS information is a part of a Service Level Agreement (SLA) between a network operator and the SCS/AS. When the NEF node receives the request from the SCS/AS to provide the QoS for the AS session, the NEF node acts as an Application Function (AF) according to 3GPP TS 23.203 (Release 15/16) and TS 23.503 (Release 15/16) and transfers the request to a Policy Control Function (PCF) node (or Policy and Charging Rules Function (PCRF) node in LTE).

According to 3GPP TS 23.682 (Release 15/16) and TS 23.502 (Release 15/16) an end-to-end flow for the ADQ functionality is described as follows. When a UE attaches or registers to a network, or when the UE establishes a new Packet Data Network (PDN) connection, a User Plane Function (UPF) node (or PDN Gateway (GW) in LTE) obtains the UE's Mobile Station Integrated Services Digital Network Number (MSISDN) and Internet Protocol (IP) address. The UPF node (or Policy and Charging Enforcement Function (PCEF) node in LTE, which is a functional entity located at the PDN GW) determines that a Policy and Charging Control (PCC) authorization is required and requests authorization of allowed services and PCC rules from a PCF node. The UPF node includes, among others, the UE's MSISDN and IP address in the request. This is known as "IP Connectivity Access Network (CAN) session establishment". In order to set up a connection between the SCS/AS and the UE with a required QoS, the SCS/AS sends an On-demand QoS request (including AF session information, such as the UE's IP address, an SCS/AS Identifier, a description of application flows and a QoS reference) to the NEF node. The NEF node sends the UE's IP address, the SCS/AS Identifier, the Description of the application flows and the QoS reference to the PCF node and triggers a PCF initiated IP-CAN Session Modification, e.g., for QoS change. The PCF node makes the authorization and policy decision and sends a PCC Provision (including PCC Rules, Event Trigger and Event Report) to the UPF node. Here, the PCF node performs a process known as "Session Binding", where the AF session information is associated with one and only one IP CAN session by taking the UE's IP version 4 (IPv4) address or IP version 6 (IPv6) prefix, and possibly a UE identity (e.g., MSISDN), into account. Finally, the UPF node enforces the decision.

SUMMARY

Within a Public Land Mobile Network (PLMN), there may be several separate IP address domains. A UPF node can allocate IP addresses from a private address range in each IP address domain to UEs. One IP address can thus be allocated to different UEs served by UPF nodes in different address domains, especially when IPv4 addresses are used. If one PCF node controls a number of UPF nodes in different IP address domains, it may not be able to uniquely identify a UE based on its IP address during a session binding process. For example, an AF node, e.g., an NEF node, can serve UEs in different IP address domains, either by having direct IP interfaces to those domains, or by having interconnections via Network Address Translation (NAT) in a user plane between the UPF node and the AF node. If the NAT is not used, the AF node obtains the IP address allocated to the UE via application level signaling and provides it as Framed-IP-Address to the PCF node for session binding. If the NAT is used, in addition to the Framed-IP-Address, additional information would be required for the PCF node to uniquely identify the UE in the session binding process.

According to 3GPP TS 29.122 (Release 15/16) (T8 specification), a QoS Application Programing Interface (API) is defined to allow the SCS/AS to change a QoS for a UE. However, the API requires the SCS/AS to provide the UE's IP address (i.e., Framed-IP-Address) to the NEF node, but does not require the SCS/AS to provide any additional information that can be used to identify an associated IP domain. As a result, the NEF node cannot provide such additional information to the PCF node for the QoS change, and accordingly, the PCF node may not be able to uniquely identify the UE in a session binding process.

On the other hand, it may be desired that the NEF node can expose directly to a UE a capability to change a QoS for the UE. In this case, the NEF node would also need such additional information to be provided to the PCF node, such that the PCF node can uniquely identify the UE in a session binding process. Furthermore, unlike the SCS/AS-NEF communication where the NEF node can authenticate the SCS/AS by means of e.g., Hyper Text Transfer Protocol (HTTP) Basic Authentication, it would be particularly advantageous if the NEF node can authenticate the UE and thus obtain the additional information in a secure and trusted manner.

It is an object of the present disclosure to provide a terminal device, an application server, an NEF node and methods therein, capable of enabling the NEF node to obtain such additional information, thereby e.g., facilitating ADQ.

According to a first aspect of the present disclosure, a method in a terminal device is provided. The method includes: transmitting to an NEF node a QoS request including an IP address of the terminal device and information enabling the NEF node to determine an identifier of the terminal device.

In an embodiment, the method can further include: transmitting to the NEF node an authentication request including data from which the identifier is derivable; and receiving from the NEF node an authentication response including the information.

In an embodiment, the identifier can be derivable from the data based on Generic Bootstrapping Architecture (GBA) or Extensible Authentication Protocol and Key Agreement (EAP-AKA).

In an embodiment, the identifier can be an International Mobile Station Identity (IMSI).

In an embodiment, the information can be a security token.

According to a second aspect of the present disclosure, a method in an NEF node is provided. The method includes: receiving from a terminal device a QoS request including an IP address of the terminal device and information enabling the NEF node to determine an identifier of the terminal device; determining the identifier based on the information; and transmitting to a PCF node a request to initiate a QoS modification, the request including the IP address and the identifier.

In an embodiment, the method can further include: receiving from the terminal device an authentication request including data from which the identifier is derivable; deriving the identifier from the data; generating the information in association with the identifier; and transmitting to the terminal device an authentication response including the information.

In an embodiment, the identifier can be derived from the data based on GBA or EAP-AKA.

In an embodiment, the identifier can be an IMSI.

In an embodiment, the information can be a security token.

According to a third aspect of the present disclosure, a method in an application server is provided. The method includes: transmitting to an NEF node a QoS request associated with a terminal device, the QoS request including an IP address of the terminal device and an identifier of the terminal device.

In an embodiment, the method can further include: transmitting to the NEF node authentication information to enable the NEF node to authenticate the application server.

In an embodiment, the identifier can be a Mobile Station Integrated Services Digital Network Number (MSISDN).

According to a fourth aspect of the present disclosure, a method in an NEF node is provided. The method includes: receiving from an application server a QoS request associated with a terminal device, the QoS request including an IP address of the terminal device and an identifier of the terminal device; and transmitting to a PCF node a request to initiate a QoS modification, the request including the IP address and the identifier.

In an embodiment, the method can further include: receiving authentication information from the application server; and authenticating the application server based on the authentication information.

In an embodiment, the identifier can be an MSISDN.

According to a fifth aspect of the present disclosure, a terminal device is provided. The terminal device includes a communication interface, a processor and a memory. The memory contains instructions executable by the processor whereby the terminal device is operative to perform the method according to the above first aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above first aspect.

According to a seventh aspect of the present disclosure, an application server is provided. The application server includes a communication interface, a processor and a memory. The memory contains instructions executable by the processor whereby the application server is operative to perform the method according to the above third aspect.

According to an eighth aspect of the present disclosure, a computer readable storage medium is provided. The computer readable storage medium has computer program instructions stored thereon. The computer program instructions, when executed by a processor in an application server, cause the application server to perform the method according to the above third aspect.

According to a ninth aspect of the present disclosure, an NEF node is provided. The NEF node includes a communication interface, a processor and a memory. The memory contains instructions executable by the processor whereby the NEF node is operative to perform the method according to the above second or fourth aspect.

According to a tenth aspect of the present disclosure, a computer readable storage medium is provided. The computer readable storage medium has computer program instructions stored thereon. The computer program instructions, when executed by a processor in an NEF node, cause the NEF node to perform the method according to the above second or fourth aspect.

With the embodiments of the present disclosure, a terminal device or an application server can transmit to an NEF node a QoS request including an identifier of the terminal device, or information enabling the NEF node to determine the identifier. Accordingly, the NEF node can obtain the identifier and thus provide the identifier to a PCF node, such that the PCF node can uniquely identify the terminal device in e.g., a session binding process.

BRIEF DESCRIPTION OF THE DRAWINGS

The above and other objects, features and advantages will be more apparent from the following description of embodiments with reference to the figures, in which:

FIG. 1 is a flowchart illustrating a method in a terminal device according to an embodiment of the present disclosure;

FIG. 2 is a flowchart illustrating a method in an NEF node according to an embodiment of the present disclosure;

DETAILED DESCRIPTION

Figure 3:
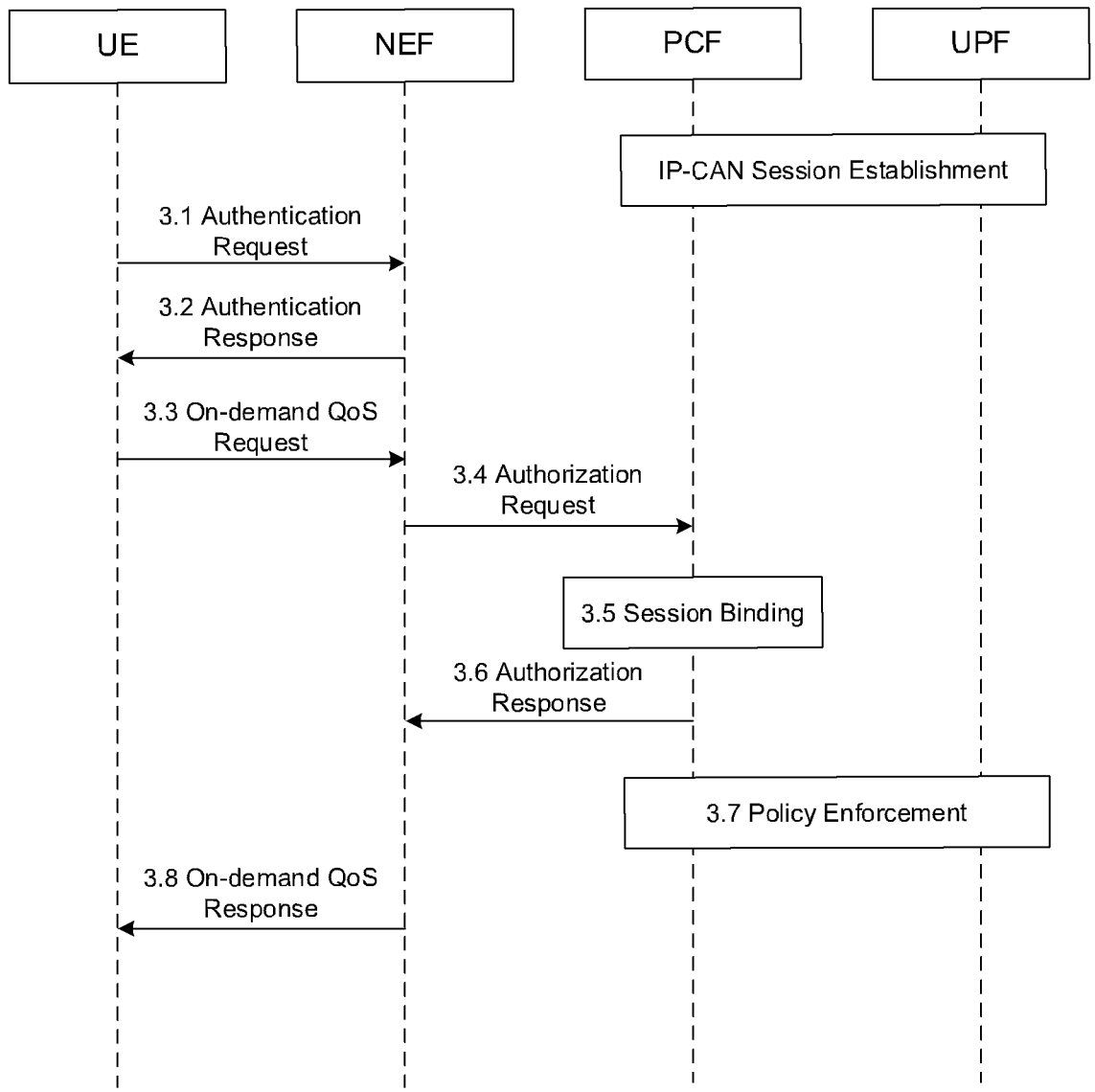
FIG. 3 is a sequence chart explaining the methods shown in FIGS. 1 and 2.

As used herein, the term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's Global System for Mobile Communications (GSM), Universal Mobile Telecommunications System (UMTS), Long Term Evolution (LTE), and/or 5G (the fifth generation) standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

In the following, references in the specification to "one embodiment", "an embodiment", "an example embodiment" and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Unless indicated otherwise, all features described in connection with 5G network nodes or functional entities also apply to their LTE equivalents, or vice versa.

FIG. 1 is a flowchart illustrating a method 100 according to an embodiment of the present disclosure. The method 100 can be performed at a terminal device, e.g., a UE.

At block 110, a QoS request is transmitted to an NEF (or SCEF) node. The QoS request includes an IP address of the terminal device and information enabling the NEF node to determine an identifier of the terminal device. Here, the QoS request can be e.g., an On-demand QoS Request. The identifier can be e.g., an International Mobile Station Identity (IMSI).

In an example, e.g., prior to the block 110, the terminal device can transmit to the NEF node an authentication request including data from which the identifier is derivable. For example, the identifier (e.g., IMSI) can be derivable from the data based on Generic Bootstrapping Architecture (GBA) or Extensible Authentication Protocol and Key Agreement (EAP-AKA). Then, the terminal device can receive from the NEF node an authentication response including the information. This authentication response allows the NEF node to authenticate the terminal device, such that it can obtain the identifier from a trusted terminal device in a secure manner.

In an example, the information can be a security token. The security token may be generated by the NEF node in association with the identifier.

FIG. 2 is a flowchart illustrating a method 200 according to an embodiment of the present disclosure. The method 200 can be performed at an NEF (or SCEF) node.

At block 210, a QoS request is received from a terminal device. The QoS request includes an IP address of the terminal device and information enabling the NEF node to determine an identifier of the terminal device. Here, the QoS request can be e.g., an On-demand QoS Request. The identifier can be e.g., an IMSI, and the information can be e.g., a security token.

At block 220, the identifier is determined based on the information, and the terminal device is authenticated.

At block 230, a request to initiate a QoS modification is transmitted to a PCF node. The request includes the IP address and the identifier.

In an example, e.g., prior to the block 210, the NEF node can receive from the terminal device an authentication request including data from which the identifier is derivable, and derive the identifier from the data, e.g., based on GBA or EAP-AKA. Then, the NEF node can generate the information (e.g., security token) in association with the identifier, and transmit to the terminal device an authentication response including the information.

The methods 100 and 200 will be further explained below with reference to a sequence chart of FIG. 3.

As shown in FIG. 3, initially a UPF (or PCEF) node and a PCF (or PCRF) node interact to perform an IP-CAN session establishment for a UE. The UPF assigns an IP address to the UE and configures a default QoS (e.g., a default bandwidth) for a service between the UE and an application server. The PCF node obtains the UE's IP address from the UPF node. At 3.1, the UE sends an authentication request to an NEF (or SCEF) node, the authentication request including (encrypted) data enabling the NEF node to determine an IMSI of the UE. Upon receiving the authentication request, the NEF node derives the IMSI of the UE from the data and authenticates the UE based on e.g., GBA or EAP-AKA. The NEF node generates a security token in association with the IMSI. At 3.2, the NEF node sends an authentication response to the UE, including the security token and indicating that the UE has been authenticated. At 3.3, in order to achieve a requested QoS for the service (e.g., to change the default QoS to the requested QoS), the UE sends an On-demand QoS Request to the NEF node, including the UE's IP address, an SCS/AS identifier, a description of application flows, a QoS reference associated with the requested QoS and the security token. The NEF node authenticates the On-demand QoS Request by verifying the security token and determines the IMSI from the security token (as the security token is associated with the IMSI). At 3.4, the NEF node sends an Npcf_PolicyAuthorization_Create Request (or Authenticate-Authorize Request (AAR)), including the UE's IP address, IMSI, SCS/AS identifier, description of application flows and QoS reference, to the PCF node to trigger a PCF initiated IP-CAN session modification as defined in Clause 7.4.2 of 3GPP TS 23.203. At 3.5, the PCF node performs a session binding process based on the UE' IP address and IMSI. Here, with the IMSI, the PCF node can uniquely identify the UE and its associated IP-CAN session. The PCF node derives the requested QoS from the information provided by the NEF node, determines whether the QoS is to be allowed and notifies the result to the NEF node via an Npcf_PolicyAuthorization_Create Response (or an Authenticate-Authorize Answer (AAA)) at 3.6. At 3.7, the PCF node notifies the UPF node to perform the IP-CAN session modification to enforce the requested QoS (if the requested QoS is allowed). At 3.8, the NEF node sends an On-demand QoS Response to the UE, indicating whether the requested QoS is allowed or not.

For further details of the sequence shown in FIG. 3, reference can be made to 3GPP TS 23.682 (Release 15/16), TS 23.502 (Release 15/16) and TS 29.122 (Release 15/16).

Figure 4:
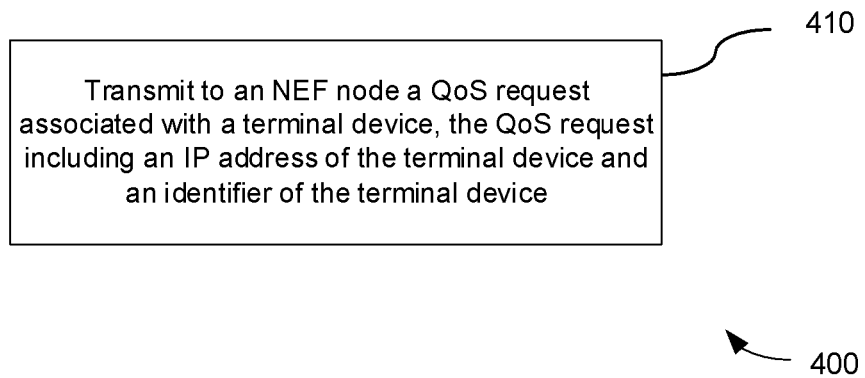
FIG. 4 is a flowchart illustrating a method in an application server according to an embodiment of the present disclosure.

FIG. 4 is a flowchart illustrating a method 400 according to an embodiment of the present disclosure. The method 400 can be performed at an application server, e.g., an SCS/AS.

At block 410, a QoS request associated with a terminal device is transmitted to an NEF (or SCEF) node. The QoS request includes an IP address of the terminal device and an identifier of the terminal device. Here, the QoS request can be e.g., an On-demand QoS Request. The identifier can be an MSISDN.

In an example, e.g., prior to the block 410, the application server can transmit to the NEF node authentication information to enable the NEF node to authenticate the application server. Here, for example, the authentication information can be information for HTTP Basic Authentication, Oauth 2.0, or Mutual Authentication with Transport Layer Security (TLS).

Figure 5:
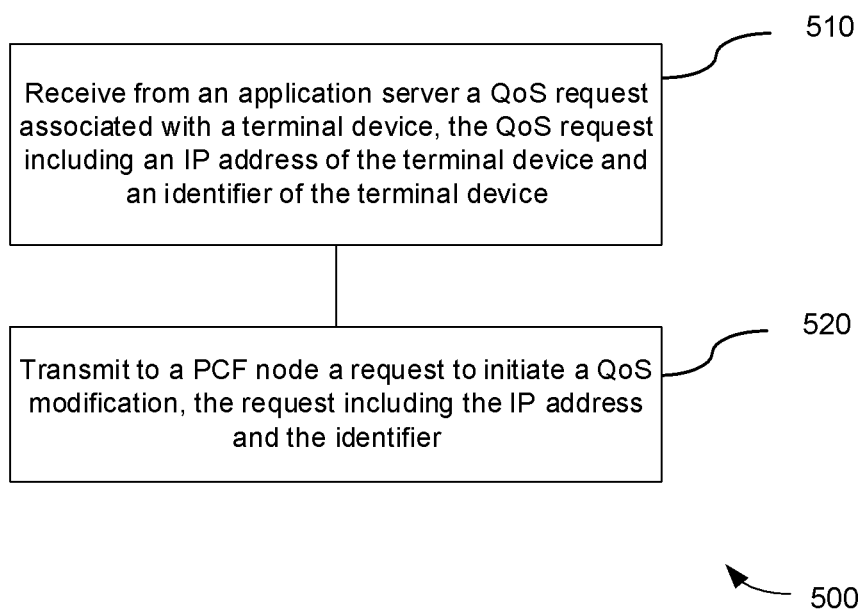
FIG. 5 is a flowchart illustrating a method in an NEF node according to another embodiment of the present disclosure.

FIG. 5 is a flowchart illustrating a method 500 according to an embodiment of the present disclosure. The method 500 can be performed at an NEF (or SCEF) node.

At block 510, a QoS request associated with a terminal device is received from an application server (e.g., SCS/AS). The QoS request includes an IP address of the terminal device and an identifier of the terminal device. Here, the QoS request can be e.g., an On-demand QoS Request. The identifier can be an MSISDN.

In an example, e.g., prior to the block 510, the NEF node can receive authentication information from the application server and authenticate the application server based on the authentication information, e.g., using HTTP Basic Authentication, Oauth 2.0, or Mutual Authentication with TLS.

At block 520, a request to initiate a QoS modification is transmitted to a PCF node. The request includes the IP address and the identifier.

The methods 400 and 500 will be further explained below with reference to a sequence chart of FIG. 6.

Figure 6:
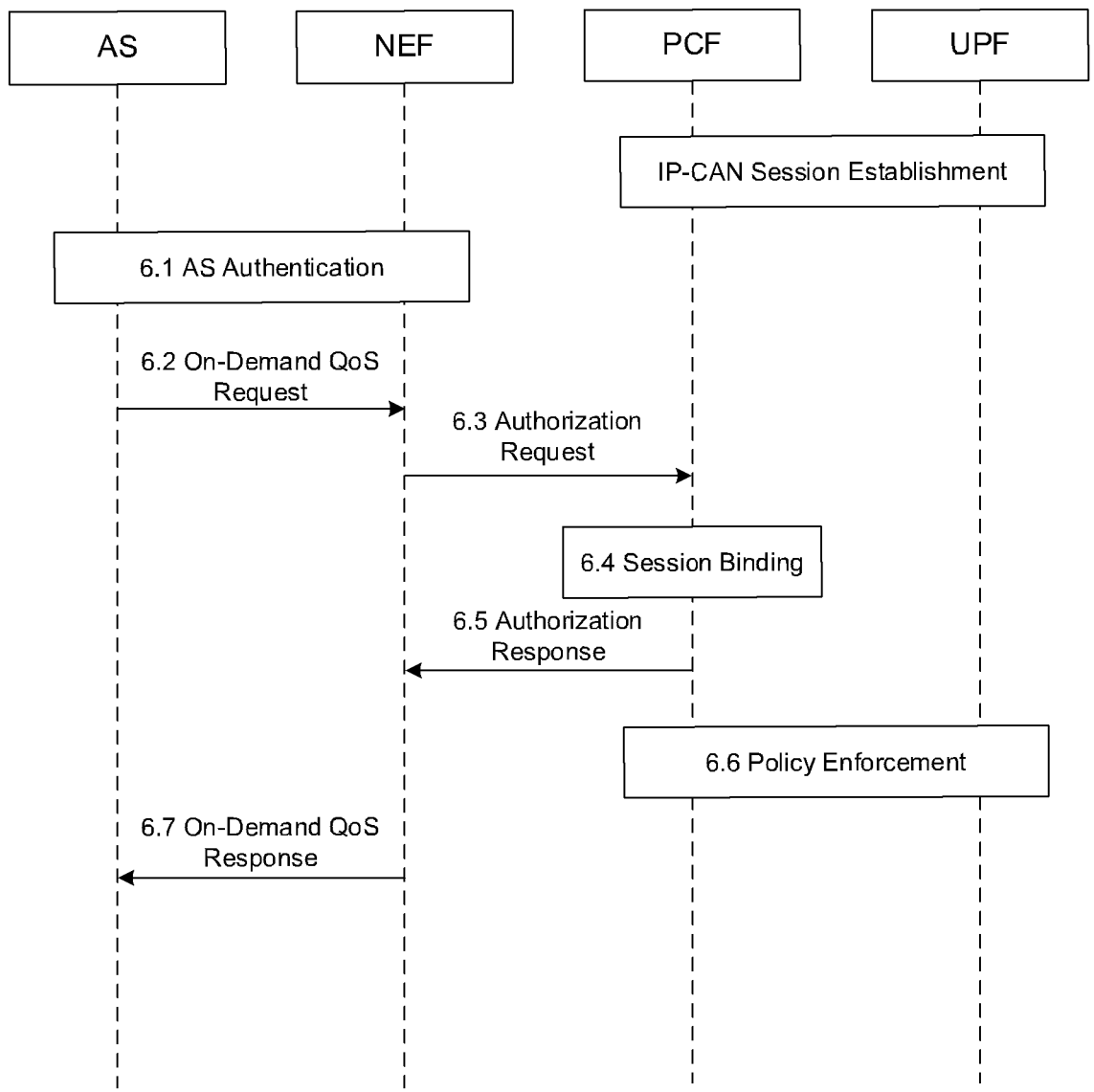
FIG. 6 is a sequence chart explaining the methods shown in FIGS. 4 and 5.

As shown in FIG. 6, initially a UPF (or PCEF) node and a PCF (or PCRF) node interact to perform an IP-CAN session establishment for a UE. The UPF assigns an IP address to the UE and configures a default QoS (e.g., a default bandwidth) for a service between the UE and an application server (e.g., SCS/AS). The PCF node obtains the UE's IP address from the UPF node. At 6.1, an NEF (or SCEF) node receives authentication information from the application server and authenticates the application server based on the authentication information. At 6.2, in order to achieve a requested QoS for the service (e.g., to change the default QoS to the requested QoS), the application server sends an On-demand QoS Request to the NEF node, including the UE's IP address, an SCS/AS identifier, a description of application flows, a QoS reference associated with the requested QoS and an MSISDN of the UE. For this purpose, a new attribute name 'MSISDN' of type AsSessionWithQoSSubscription can be added in AsSessionWithQoS API, and a new attribute name 'MSISDN' of type ChargeableParty can be added in ChargeableParty API. The NEF node authorizes the On-demand QoS Request, and sends, at 6.3, an Npcf_PolicyAuthorization_Create Request (or AAR), including the UE's IP address, SCS/AS identifier, description of application flows, QoS reference and MSISDN, to the PCF node to trigger a PCF initiated IP-CAN session modification as defined in Clause 7.4.2 of 3GPP TS 23.203. At 6.4, the PCF node performs a session binding process based on the UE' IP address and IMSI. Here, with the IMSI, the PCF node can uniquely identify the UE and its associated IP-CAN session. The PCF node derives the requested QoS from the information provided by the NEF node, determines whether the QoS is to be allowed and notifies the result to the NEF node via an Npcf_PolicyAuthorization_Create Response (or AAA) at 6.5. At 6.6, the PCF node notifies the UPF node to perform the IP-CAN session modification to enforce the requested QoS (if the requested QoS is allowed). At 6.7, the NEF node sends an On-demand QoS Response to the application server, indicating whether the requested QoS is allowed or not.

For further details of the sequence shown in FIG. 6, reference can be made to 3GPP TS 23.682 (Release 15/16), TS 23.502 (Release 15/16) and TS 29.122 (Release 15/16).

Figure 7:
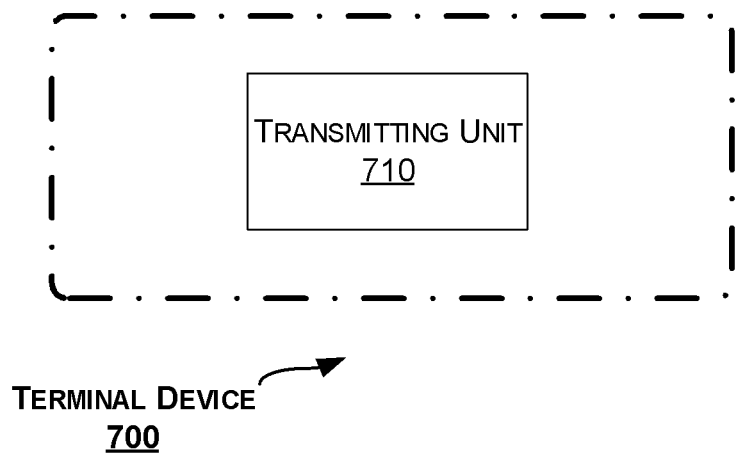
FIG. 7 is a block diagram of a terminal device according to an embodiment of the present disclosure.

Correspondingly to the method 100 as described above, a terminal device is provided. FIG. 7 is a block diagram of a terminal device 700 according to an embodiment of the present disclosure.

As shown in FIG. 7, the terminal device 700 includes a unit 710 (e.g., a transmitting unit) configured to transmit to an NEF node a QoS request including an IP address of the terminal device and information enabling the NEF node to determine an identifier of the terminal device.

In an embodiment, the unit 710 can be further configured to transmit to the NEF node an authentication request including data from which the identifier is derivable. The terminal device 700 can further include a receiving unit configured to receive from the NEF node an authentication response including the information.

In an embodiment, the identifier can be derivable from the data based on GBA or EAP-AKA.

In an embodiment, the identifier can be an IMSI.

In an embodiment, the information can be a security token.

The unit 710 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 8:
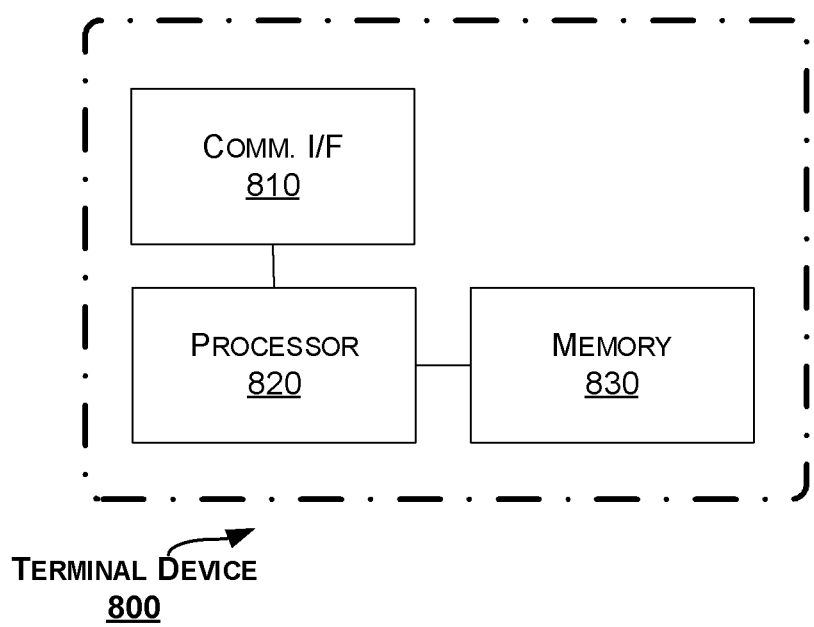
FIG. 8 is a block diagram of a terminal device according to another embodiment of the present disclosure.

FIG. 8 is a block diagram of a terminal device 800 according to another embodiment of the present disclosure.

The terminal device 800 includes a communication interface 810, a processor 820 and a memory 830. The memory 830 contains instructions executable by the processor 820 whereby the terminal device 800 is operative to perform the actions, e.g., of the procedure described earlier in conjunction with FIG. 1. Particularly, the memory 830 contains instructions executable by the processor 820 whereby the terminal device 800 is operative to: transmit to an NEF node a QoS request including an IP address of the terminal device and information enabling the NEF node to determine an identifier of the terminal device.

In an embodiment, the memory 830 can further contain instructions executable by the processor 820 whereby the terminal device 800 is operative to: transmit to the NEF node an authentication request including data from which the identifier is derivable; and receive from the NEF node an authentication response including the information.

In an embodiment, the identifier can be derivable from the data based on GBA or EAP-AKA.

In an embodiment, the identifier can be an IMSI.

In an embodiment, the information can be a security token.

Figure 9:
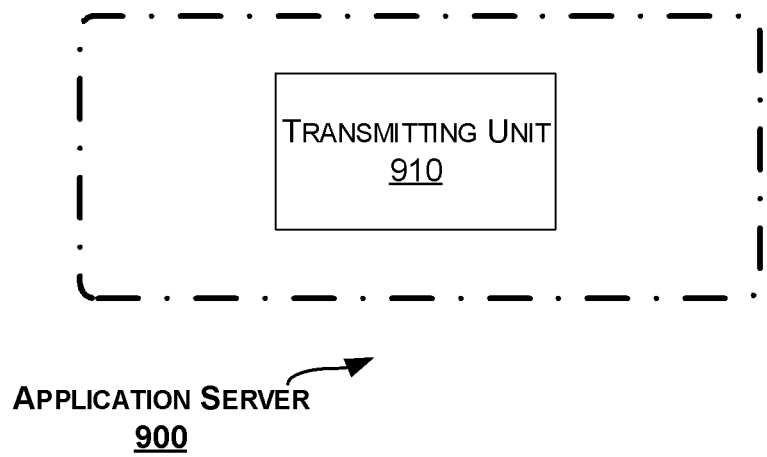
FIG. 9 is a block diagram of an application server according to an embodiment of the present disclosure.

Correspondingly to the method 400 as described above, an application server is provided. FIG. 9 is a block diagram of an application server 900 according to an embodiment of the present disclosure.

As shown in FIG. 9, the application server 900 includes a unit 910 (e.g., a transmitting unit) configured to transmit to an NEF node a QoS request associated with a terminal device, the QoS request including an IP address of the terminal device and an identifier of the terminal device.

In an embodiment, the unit 910 can be further configured to transmit to the NEF node authentication information to enable the NEF node to authenticate the application server.

In an embodiment, the identifier can be an MSISDN.

The unit 910 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 10:
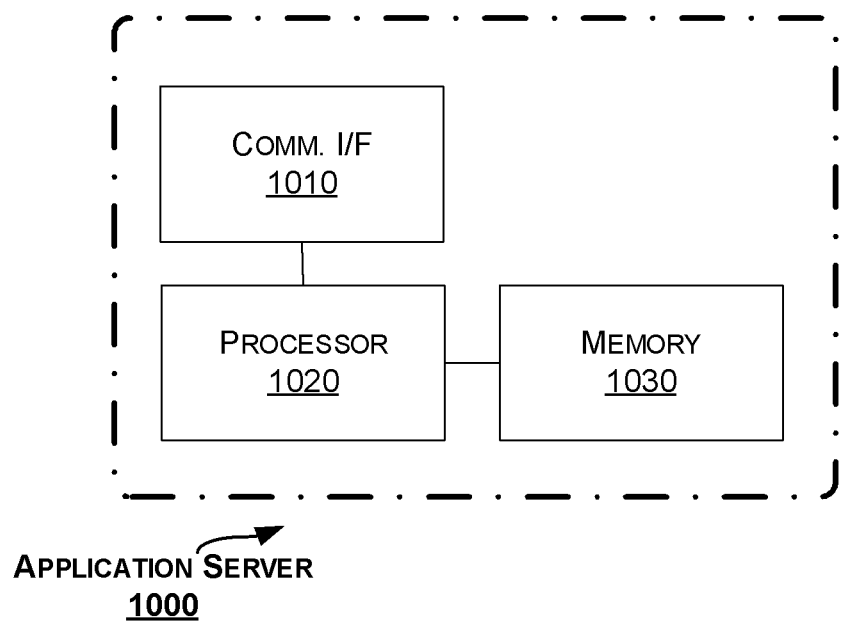
FIG. 10 is a block diagram of an application server according to another embodiment of the present disclosure.

FIG. 10 is a block diagram of an application server 1000 according to another embodiment of the present disclosure.

The application server 1000 includes a communication interface 1010, a processor 1020 and a memory 1030. The memory 1030 contains instructions executable by the processor 1020 whereby the application server 1000 is operative to perform the actions, e.g., of the procedure described earlier in conjunction with FIG. 4. Particularly, the memory 1030 contains instructions executable by the processor 1020 whereby the application server 1000 is operative to: transmit to an NEF node a QoS request associated with a terminal device, the QoS request including an IP address of the terminal device and an identifier of the terminal device.

In an embodiment, the memory 1030 can further contain instructions executable by the processor 1020 whereby the application server 1000 is operative to: transmit to the NEF node authentication information to enable the NEF node to authenticate the application server.

In an embodiment, the identifier can be an MSISDN.

Figure 11:
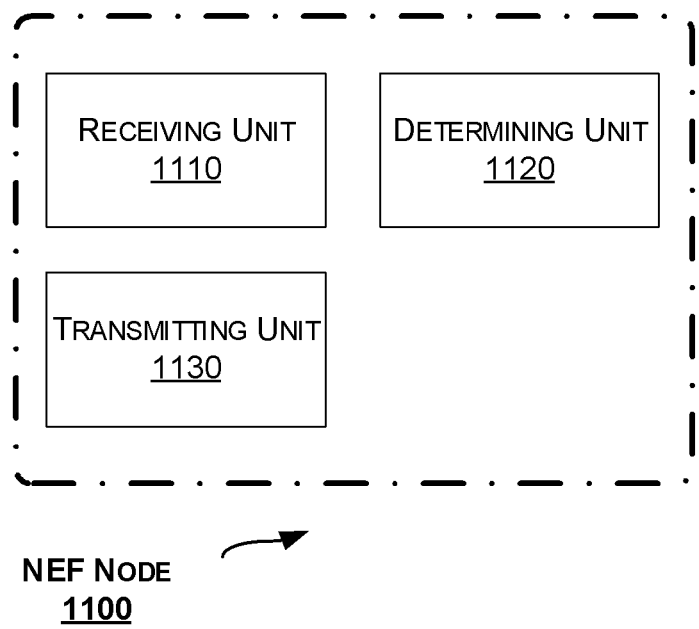
FIG. 11 is a block diagram of an NEF node according to an embodiment of the present disclosure.

Correspondingly to the method 200 as described above, an NEF node is provided. FIG. 11 is a block diagram of an NEF node 1100 according to an embodiment of the present disclosure.

As shown in FIG. 11, the NEF node 1100 includes a receiving unit 1110 configured to receive from a terminal device a QoS request including an IP address of the terminal device and information enabling the NEF node to determine an identifier of the terminal device. The NEF node 1100 further includes a determining unit 1120 configured to determine the identifier based on the information. The NEF node 1100 further includes a transmitting unit 1130 configured to transmit to a PCF node a request to initiate a QoS modification, the request including the IP address and the identifier.

In an embodiment, the receiving unit 1110 can be further configured to receive from the terminal device an authentication request including data from which the identifier is derivable. The NEF node 1100 can further include a deriving unit configured to derive the identifier from the data and a generating unit configured to generate the information in association with the identifier. The transmitting unit 1130 can be further configured to transmit to the terminal device an authentication response including the information.

In an embodiment, the identifier can be derived from the data based on GBA or EAP-AKA.

In an embodiment, the identifier can be an IMSI.

In an embodiment, the information can be a security token.

The units 1110-1130 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2.

Figure 12:
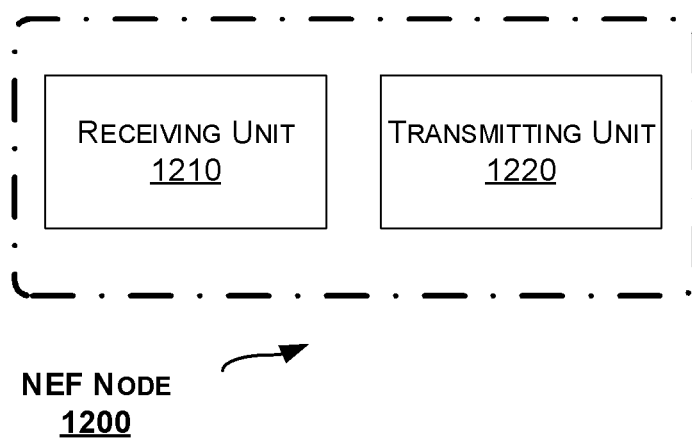
FIG. 12 is a block diagram of an NEF node according to another embodiment of the present disclosure.

Correspondingly to the method 500 as described above, an NEF node is provided. FIG. 12 is a block diagram of an NEF node 1200 according to another embodiment of the present disclosure.

As shown in FIG. 12, the NEF node 1200 can include a receiving unit 1210 configured to receive from an application server a QoS request associated with a terminal device, the QoS request including an IP address of the terminal device and an identifier of the terminal device. The NEF node 1200 further includes a transmitting unit 1220 configured to transmit to a PCF node a request to initiate a QoS modification, the request including the IP address and the identifier.

In an embodiment, the receiving unit 1210 can be further configured to receive authentication information from the application server. The NEF node 1200 can further include an authenticating unit configured to authenticate the application server based on the authentication information.

In an embodiment, the identifier can be an MSISDN.

The units 1210-1220 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 5.

Figure 13:
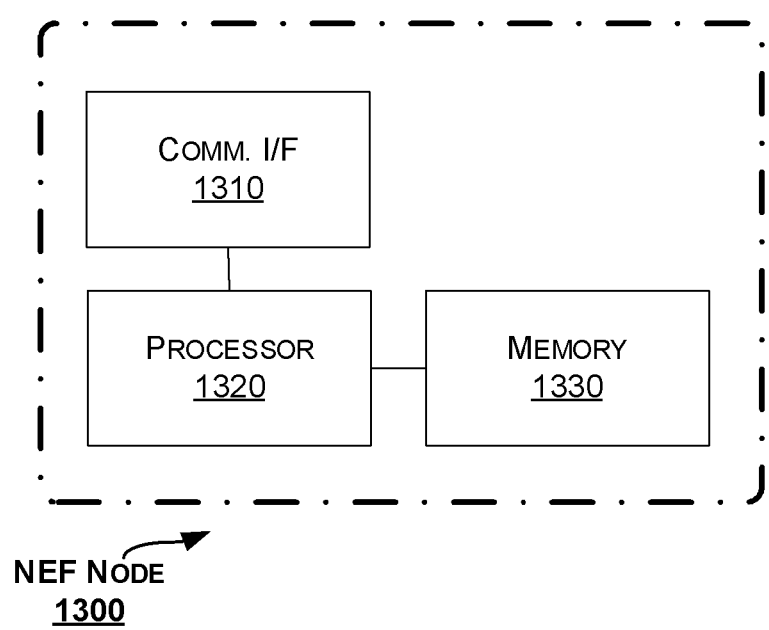
FIG. 13 is a block diagram of an NEF node according to yet another embodiment of the present disclosure.

FIG. 13 is a block diagram of an NEF node 1300 according to yet another embodiment of the present disclosure.

The NEF node 1300 includes a communication interface 1310, a processor 1320 and a memory 1330. For example, the memory 1330 can contain instructions executable by the processor 1320 whereby the NEF node 1300 is operative to perform the actions, e.g., of the procedure described earlier in conjunction with FIG. 2. Particularly, the memory 1330 can contain instructions executable by the processor 1320 whereby the NEF node 1300 is operative to: receive from a terminal device a QoS request including an IP address of the terminal device and information enabling the NEF node to determine an identifier of the terminal device; determine the identifier based on the information; and transmit to a PCF node a request to initiate a QoS modification, the request including the IP address and the identifier.

In an embodiment, the memory 1330 can contain instructions executable by the processor 1320 whereby the NEF node 1300 is operative to: receive from the terminal device an authentication request including data from which the identifier is derivable; derive the identifier from the data; generate the information in association with the identifier; and transmit to the terminal device an authentication response including the information.

In an embodiment, the identifier can be derived from the data based on GBA or EAP-AKA.

In an embodiment, the identifier can be an IMSI.

In an embodiment, the information can be a security token.

Alternatively, the memory 1330 can contain instructions executable by the processor 1320 whereby the NEF node 1300 is operative to perform the actions, e.g., of the procedure described earlier in conjunction with FIG. 5. Particularly, the memory 1330 can contain instructions executable by the processor 1320 whereby the NEF node 1300 is operative to: receive from an application server a QoS request associated with a terminal device, the QoS request including an IP address of the terminal device and an identifier of the terminal device; and transmit to a PCF node a request to initiate a QoS modification, the request including the IP address and the identifier.

In an embodiment, the memory 1330 can contain instructions executable by the processor 1320 whereby the NEF node 1300 is operative to: receive authentication information from the application server; and authenticate the application server based on the authentication information.

In an embodiment, the identifier can be an MSISDN.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 820 causes the terminal device 800 to perform the actions, e.g., of the procedure described earlier in conjunction with FIG. 1, and/or code/computer readable instructions, which when executed by the processor 1020 causes the application server 1000 to perform the actions, e.g., of the procedure described earlier in conjunction with FIG. 4, and/or code/computer readable instructions, which when executed by the processor 1320 causes the NEF node 1300 to perform the actions, e.g., of the procedure described earlier in conjunction with FIG. 2 or 5.

The computer program product may be configured as a computer program code structured in computer program modules. The computer program modules could essentially perform the actions of the flow illustrated in FIG. 1, 2, 4 or 5.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Network Exposure Function, NEF, node, comprising:
    receiving from a terminal device a Quality of Service, QOS, request including an Internet Protocol, IP, address of the terminal device and information enabling the NEF node to determine an identifier of the terminal device;
    determining the identifier based on the information; and
    transmitting to a Policy Control Function, PCF, node a request to initiate a QoS modification, the request including the IP address and the identifier.

2. The method of claim 1, further comprising:
    receiving from the terminal device an authentication request including data from which the identifier is derivable;
    deriving the identifier from the data;
    generating the information in association with the identifier; and
    transmitting to the terminal device an authentication response including the information.

3. The method of claim 2, wherein the identifier is derived from the data based on Generic Bootstrapping Architecture, GBA, or Extensible Authentication Protocol and Key Agreement, EAP-AKA.

4. The method of claim 1, wherein the identifier is an International Mobile Station Identity, IMSI.

5. The method of claim 1, wherein the information is a security token.

6. A Network Exposure Function, NEF, node, comprising a communication interface, a processor and a memory, the memory comprising instructions executable by the processor whereby the NEF node is operative to perform the method according to claim 1.

7. A non-transitory computer readable storage medium having computer program instructions stored thereon, the computer program instructions, when executed by a processor in a Network Exposure Function, NEF, node, causing the NEF node to perform the method according to claim 1.

8. A method in a Network Exposure Function, NEF, node, comprising:
    receiving from an application server a Quality of Service, QoS, request associated with a terminal device, the QoS request including an Internet Protocol, IP, address of the terminal device and an identifier of the terminal device; and
    transmitting to a Policy Control Function, PCF, node a request to initiate a QoS modification, the request including the IP address and the identifier.

9. The method of claim 8, further comprising:
    receiving authentication information from the application server; and
    authenticating the application server based on the authentication information.

10. The method of claim 8, wherein the identifier is a Mobile Station Integrated Services Digital Network Number, MSISDN.

* * * * *